United States Patent
Henshaw

(10) Patent No.: US 9,681,597 B1
(45) Date of Patent: Jun. 20, 2017

(54) WEED-PULLING TOOL

(71) Applicant: Timothy M. Henshaw, Cima, CA (US)

(72) Inventor: Timothy M. Henshaw, Cima, CA (US)

( * ) Notice: Subject to any disclaimer, the term of this patent is extended or adjusted under 35 U.S.C. 154(b) by 372 days.

(21) Appl. No.: 13/901,858

(22) Filed: May 24, 2013

(51) Int. Cl.
*A01B 1/16* (2006.01)

(52) U.S. Cl.
CPC ..................... *A01B 1/16* (2013.01)

(58) Field of Classification Search
USPC .................... 254/22, 25, 131, 132
See application file for complete search history.

(56) References Cited

U.S. PATENT DOCUMENTS

| | | | | |
|---|---|---|---|---|
| 1,687,986 | A | * | 10/1928 | Miller ............................ 172/381 |
| 1,954,250 | A | * | 4/1934 | Lee ................................ 172/375 |
| 2,378,459 | A | * | 6/1945 | Beardsley ..................... 254/132 |
| 4,103,723 | A | * | 8/1978 | Carmichael ................... 144/34.5 |
| 5,383,696 | A | | 1/1995 | Speier |
| 5,533,578 | A | | 7/1996 | Powell |
| 6,056,068 | A | | 5/2000 | O'Callaghan |
| 6,213,527 | B1 | | 4/2001 | Lampe |
| 7,104,576 | B1 | | 9/2006 | Dorr |

* cited by examiner

*Primary Examiner* — Joseph J Hail
*Assistant Examiner* — Shantese McDonald
(74) *Attorney, Agent, or Firm* — Greenberg Traurig

(57) ABSTRACT

A weed-pulling tool including a rectangular blade with a V-shaped notch at one end thereof and a handle connected to the blade via a tubular extension member extending from a second end thereof. The handle forms approximately a 50° angle with the level ground when the blade is laid flat against the ground. Such a configuration provides suitable leverage whereby a user may: (i) slide the blade into position with stems from one or more weeds in the V-shaped notch and (ii) push down on the handle thereby causing rotation about a support point such that the V-shaped notch portion of the blade pulls the one or more weeds, including root systems, out of the ground. One or more stiffening ribs runs along the perimeter of the V-shaped notch. The stiffening rib helps prevent the blade portions adjacent to the V-shaped notch from bending or failing while weeds are being pulled.

12 Claims, 3 Drawing Sheets

WEED-PULLING TOOL

FIELD OF THE INVENTION

The embodiments of the present invention relate to a tool adapted to effectively and efficiently pull weeds, including root systems associated therewith.

BACKGROUND

Weeds have been a nuisance since the beginning of time. Besides being unsightly, weeds can kill neighboring plants and become kindling for brush fires. While there are weed-pulling tools and weed killers on the market, they each suffer from drawbacks.

Consequently, it would beneficial to develop an effective and efficient weed-pulling tool which does not suffer from past shortcomings.

SUMMARY

The embodiments of the present invention are directed to a weed-pulling tool comprising broadly a rectangular-shaped blade with a V-shaped notch at one end thereof and a handle connected to said blade via a tubular extension member extending from said blade at a second end thereof. In one embodiment, the handle forms approximately a 50° angle with the level ground when the blade is laid flat against the ground. Such a configuration provides suitable leverage whereby a user may: (i) slide the blade into position with stems from one or more weeds in the V-shaped notch and (ii) push down on the handle thereby causing rotation about a support point such that the V-shaped notch portion of the blade pulls the one or more weeds, including root systems, out of the ground.

In another embodiment, one or more stiffening ribs runs along the perimeter of the V-shaped notch. The stiffening rib helps prevent the blade portions adjacent to the V-shaped notch from bending or failing while weeds are being pulled.

As set forth below, fabricating the weed-pulling tool may be accomplished using various known techniques and materials.

Other variations, embodiments and features of the present invention will become evident from the following detailed description, drawings and claims.

DETAILED DESCRIPTION

Figure 1:
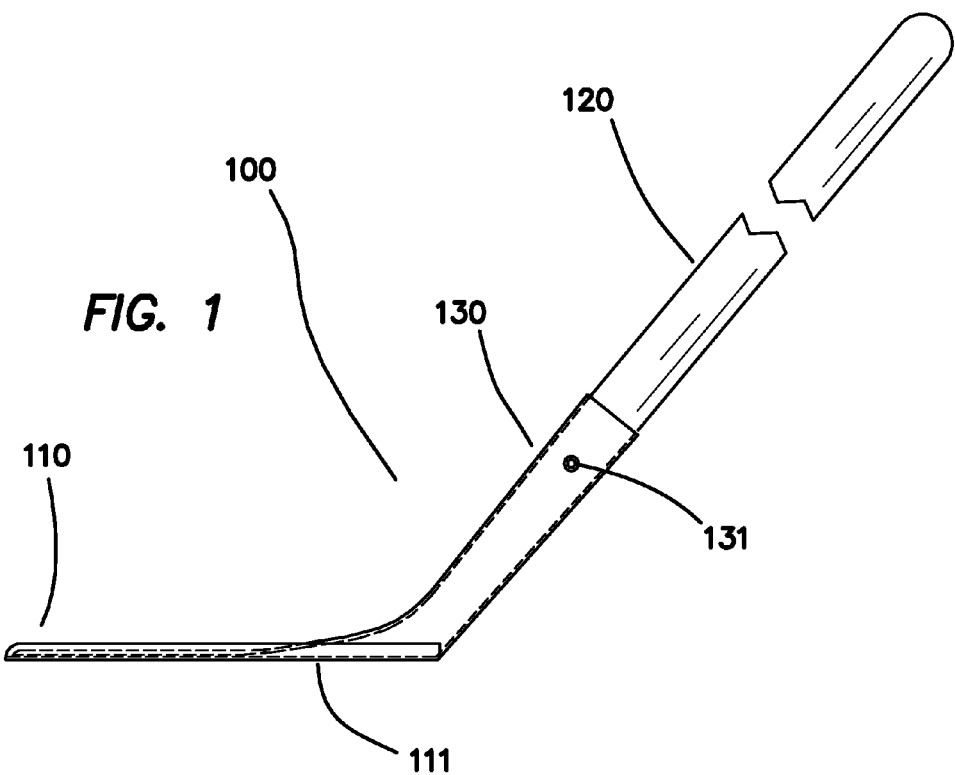
FIG. 1 illustrates a side view of a weed-pulling tool according to the embodiments of the present invention.
Figure 2:
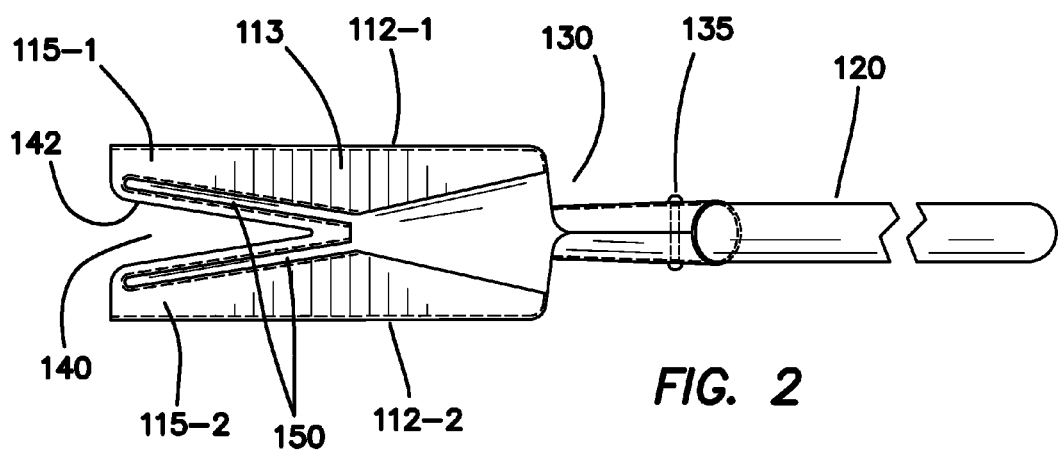
FIG. 2 illustrates a top view of a weed-pulling tool according to the embodiments of the present invention.
Figure 3:
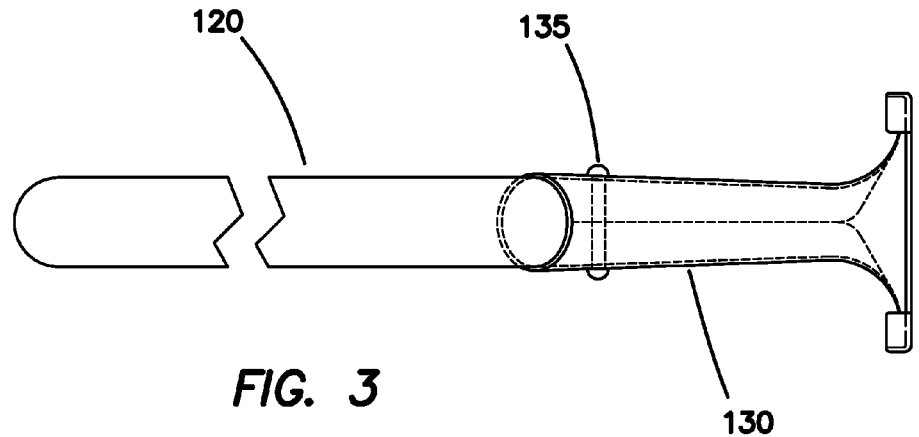
FIG. 3 illustrates a bottom view of a weed-pulling tool according to the embodiments of the present invention.
Figure 4:
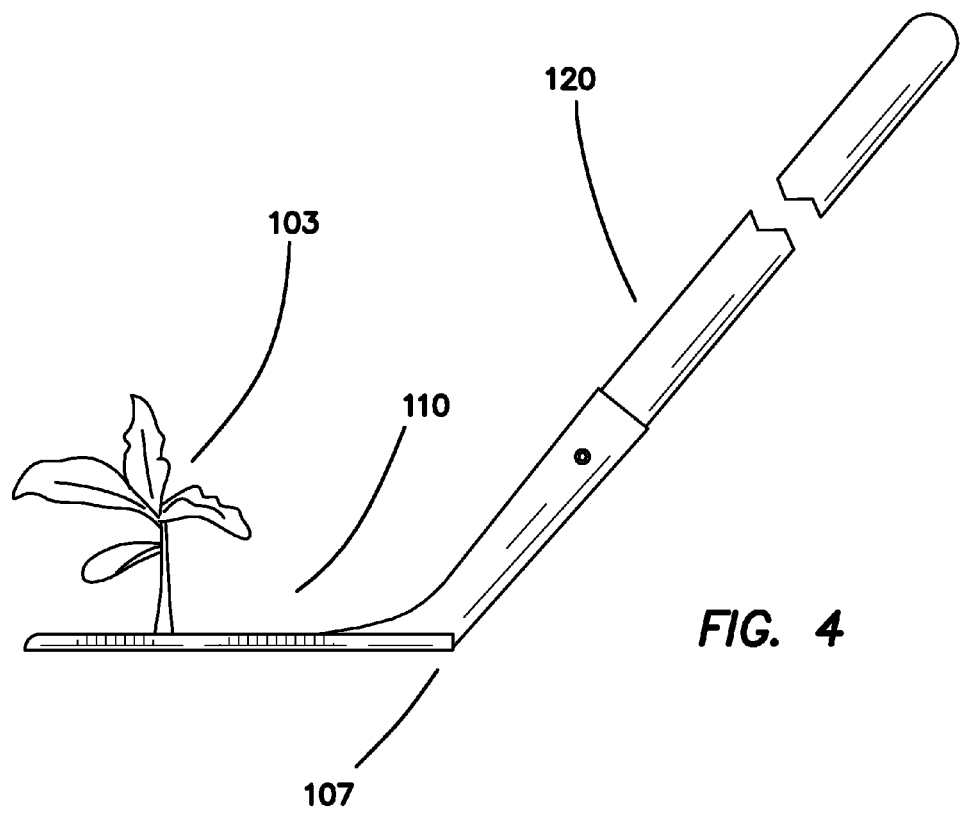
FIG. 4 illustrates a perspective view of a weed-pulling tool according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

FIGS. 1-4 show side, top and bottom views, respectively, of a weed-pulling tool 100 according to the embodiments of the present invention. The weed-pulling tool 100 includes a blade 110 and handle 120 connected to one another by means of a tubular extension 130. The blade 110, as shown, is substantially rectangular with a flat bottom surface 111 and includes a V-shaped notch 140. In one embodiment, the blade 110 is 10.25 inches in length and 4.0 inches in width. Those skilled in the art will recognize that the blade 110 may take on other dimensions without departing from the scope of the present invention.

As shown, the V-shaped notch 140 extends slightly less than half the length of the blade 110. Those skilled in the art will recognize that the V-shaped notch 140 may be shortened or lengthened relative to the length of the blade 140. As shown, the V-shaped notch 140 has an angle of 17.9°. Again, those skilled in the art will recognize that the V-shaped notch 140 may take on smaller or larger angles. A domed portion 125 resides between the V-shaped notch 140 and tubular extension 130. The domed portion 125 creates additional strength at the critical joint between the tubular extension 130 and blade 110. That is, during use, the connection between the tubular extension 130 and blade 110 experiences a majority of the stress as the handle 120 is forced downward causing the blade 110 to pivot upward about support point 107.

In one embodiment, a stiffening rib 150 runs along an upper surface 113 of the blade 110 substantially about a perimeter 142 of the V-shaped notch 140. The stiffening rib 150 helps prevent the blade portions 115-1, 115-2 adjacent to the V-shaped notch 140 from bending or failing while weeds are being pulled. That is, the V-shaped notch 140 removes a certain amount of the rectangular blade 110 which can impact the strength of the blade 110. In one embodiment, the stiffening rib 150 is 0.375 inches wide and 0.125 inches high. Those skilled in the art will recognize that the stiffening rib 150 may take on other dimensions without departing from the scope of the present invention. The stiffening rib 150 is shown as a single continuation rib but multiple individual ribs may be utilized as well. The blade 110 may also include stiffening ribs 155 running along outer edges 112-1, 112-2 of the blade 110 (i.e., along the length of the blade 110).

The handle 120 is connected to the tubular extension 130 by means of screws, nails, rivets or similar fasteners inserted through openings 131 (only one opening is viewable in the Figs.) in the tubular extension 130. A ring 135 may also be used to secure the tubular extension 130 around the handle 120. In one embodiment, the handle is 46 inches in length but the handle 120 may be shorter or longer.

In another embodiment, the handle 120 and blade 110 are a single, integral unit such that the need for a tubular extension 130 is removed.

Figure 5:
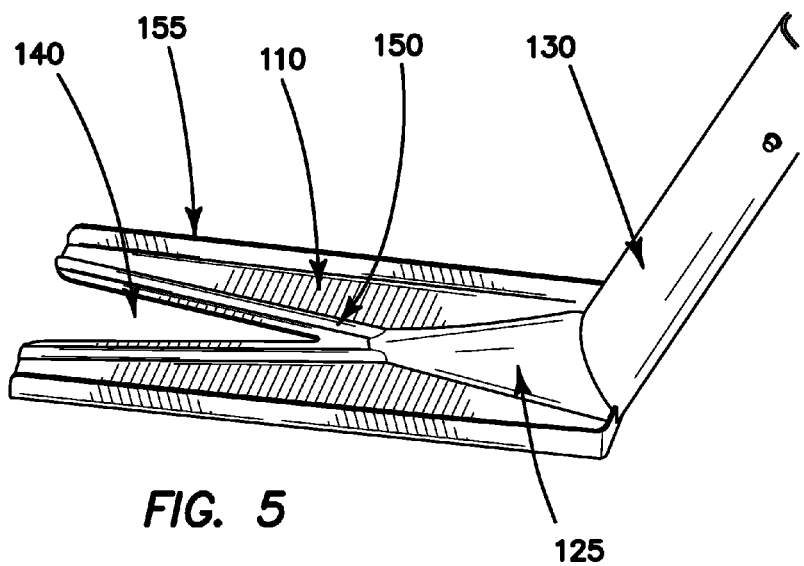
FIG. 5 illustrates a side view of a weed-pulling tool in position to pull weeds according to the embodiments of the present invention.
Figure 6:
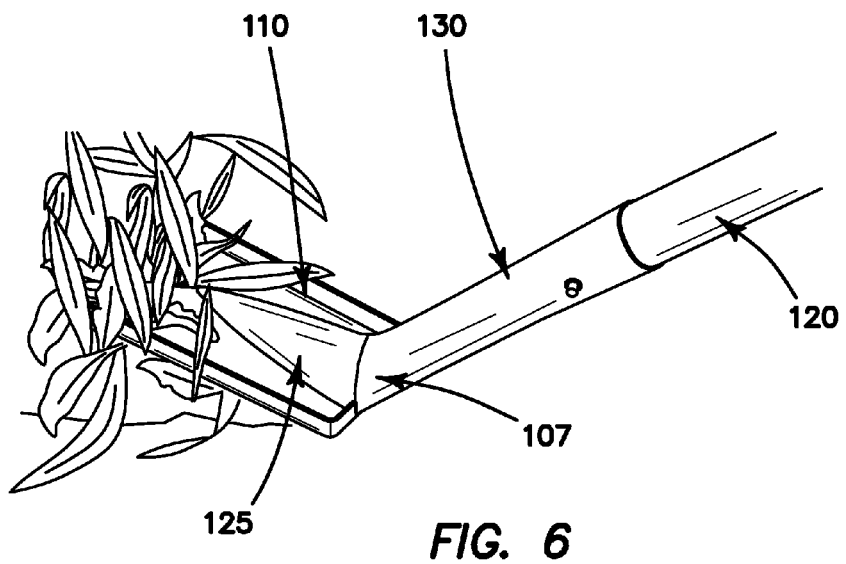
FIG. 6 illustrates a perspective upper view of a weed-pulling tool in position to pull weeds with the blade angled upward during the weed-pulling operation according to the embodiments of the present invention.

FIGS. 5 and 6 show the weed-pulling tool 100 in position with a weed 101 within the V-shaped notch 140. In practice a user: (i) slides the blade 110 into position with stems from one or more weeds 103 in the V-shaped notch 140 and (ii)

pushes down on the handle 120 thereby causing rotation about a support point 107 such that the V-shaped notch 140 of the blade 110 pulls the one or more weeds 103, including root systems, out of the ground.

The weed-pulling tool 100 may be fabricated using any known techniques including stamping, molding, forging, additive manufacturing, sculpting, combinations thereof and the like. The weed-pulling tool 100 may be fabricated using known materials such as composites, alloys, plastics, metals, woods, combinations thereof and the like. In one specific embodiment, the blade 110 and tubular extension 130 are 14 gage steel while the handle 120 is wooden.

Although the invention has been described in detail with reference to several embodiments, additional variations and modifications exist within the scope and spirit of the invention as described and defined in the following claims.

I claim:

1. A weed-pulling tool, comprising:
   a blade, said blade including a notch in one end thereof, said blade further including one or more stiffening ribs running substantially about a perimeter of said notch and a strengthening dome extending from a rear of said notch to a rear of said blade; and
   a handle extending from proximate an end of said blade opposite said notch.

2. The weed-pulling tool of claim 1 further comprising stiffening ribs running along outer edges of said blade.

3. The weed-pulling tool of claim 1 wherein said blade is rectangular in shape.

4. The weed-pulling tool of claim 1 wherein said notch is V-shaped.

5. The weed-pulling tool of claim 1 wherein said handle forms a 50° angle with level ground when said blade is flush with level ground.

6. A weed-pulling tool, comprising:
   a blade including a tubular extension extending from one end thereof, said blade including a notch in an end opposite said tubular extension, said blade further including one or more stiffening ribs running substantially about a perimeter of said notch and a strengthening dome extending from a rear of said notch to said tubular extension; and
   a handle extending from, and connected to, said tubular extension.

7. The weed-pulling tool of claim 6 further comprising stiffening ribs running along outer edges of said blade.

8. The weed-pulling tool of claim 6 wherein said blade is rectangular in shape.

9. The weed-pulling tool of claim 6 wherein said notch is V-shaped.

10. The weed-pulling tool of claim 6 wherein said handle forms a 50° angle with level ground when said blade is flush with level ground.

11. A weed-pulling tool comprising:
    a rectangular blade having a V-shaped notch in a first end thereof;
    one or more stiffening ribs running along an upper surface of the blade substantially about a perimeter of the V-shaped notch;
    a tubular extension extending from a second end thereof;
    a strengthening dome extending from a rear of said V-shaped notch to said tubular extension;
    a handle extending from, and connected to, said tubular extension.

12. The weed-pulling tool of claim 11 wherein said handle forms a 50° angle with level ground when said blade is flush with level ground.

* * * * *